United States Patent
Takigawa et al.

[11] 3,730,024
[45] May 1, 1973

[54] SAW MANUFACTURE

[76] Inventors: Shigetsugu Takigawa, 18 Kyukencho Nishi 2-cho; Masuhiko Takigawa, 12 Kyukencho Nishi 2-cho, both of Sakai City, Osaka, Japan

[22] Filed: Oct. 20, 1971

[21] Appl. No.: 190,718

[30] Foreign Application Priority Data

Oct. 20, 1970 Japan................................45/94813

[52] U.S. Cl....................................................76/112
[51] Int. Cl. .............................................B23d 65/02
[58] Field of Search......................143/133; 51/80 R, 51/80 A, 38, 40; 76/112, 25, 45

[56] References Cited

UNITED STATES PATENTS

| | | | |
|---|---|---|---|
| 2,329,879 | 9/1943 | Christy et al. | 76/41 |
| 1,250,377 | 12/1917 | Stevens | 76/112 |
| 730,455 | 6/1903 | Hanson | 51/40 |

Primary Examiner—Leonidas Vlachos
Attorney—James E. Armstrong et al.

[57] ABSTRACT

A method is provided for the manufacture of saws made of band steel plates having an extended trapezoidal cross-section. The plates are preliminarily quenched and plated prior the saw manufacture. A set of four thin disc grinding stones arranged in respective predetermined inclination, when positioned against one edge of the band steel plate, completes the process of blade shaping and edge forming simultaneously in a single operation.

9 Claims, 7 Drawing Figures

SAW MANUFACTURE

BACKGROUND OF THE INVENTION

This invention relates to the manufacture of saws, including pulling and pushing hand saws, to be used primarily for wood sawing.

In conventional saw manufacture a band steel plate is first cut to provide teeth and thereafter, in a second operation, the blades are bent or shaped to provide a cross deviation between adjacent teeth. The steel is then quenched and plated to complete the saw manufacture.

SUMMARY OF THE INVENTION

This invention provides a novel method in which feeding of a set or sets of four thin disc grinding stones arranged with respective predetermined inclination, against one edge of a special band steel plate of extended trapezoidal cross section completes the two processes of blade shaping and edge forming simultaneously in a single operation. This method enables saw teeth to be shaped and edged on the steel plate after proper quenching of the plate steel followed by a subsequent plating process, so as not to cause tempering and yet without any troublesome operation in providing cross deviation or alignment in alternating direction of adjacent teeth, thereby permitting continuous mass production of saws with uniformly arranged teeth having excellent cutting power and durability.

BRIEF DESCRIPTION OF THE DRAWINGS

The invention will be more fully understood from the following detailed description, taken in conjunction with the accompanying drawings in which.

DETAILED DESCRIPTION OF THE INVENTION

Figure 1:
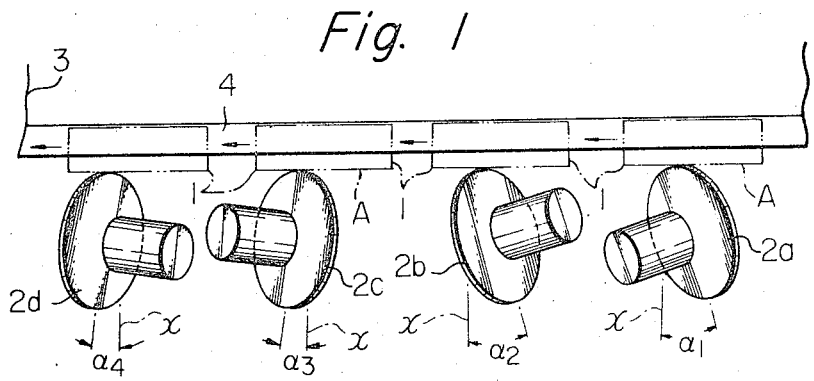
FIG. 1 is a partial schematic plan view of an embodiment of the invention.
Figure 3:
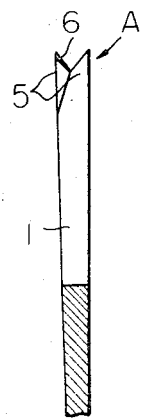
FIG. 3 is a sectional elevation along line IV—IV of FIG. 2.

In FIG. 1 band material 1, such as tool steel, is provided in pieces of thin extended trapezoidal cross-section, as shown in FIG. 3; that is, the thickness thereof is gradually reduced from the blade edge to the opposite or back side edge of the saw. The band material is properly quenched and subsequently plated with chrome or the like on its surface prior to saw manufacture according to the invention.

A set of four disc grinding wheels 2a, 2b, 2c and 2d are disposed rotatably at high speeds and arranged with respective preselected inclination against work material 1, which is secured by guide holding duct 4 formed on frame 3, with blade edge A protruded toward the cutting wheels. Wheels 2a, 2b, 2c, 2d are fed to work material in perpendicular direction intermittently at a predetermined pitch.

Wheels 2a, 2b, 2c and 2d are respectively inclined two dimensionally; by the angles $\alpha 1$, $\alpha 2$, $\alpha 3$ and $\alpha 4$ extending from vertical line X crossing the longitudinal line of work material 1 and similarly by the angles $\beta 1$, $\beta 2$, $\beta 3$ and $\beta 4$ with reference to surface y of material 1 as their standard plane.

Angles $\alpha 1$ to $\alpha 4$ are adjusted to form saw teeth 5 in approximately a V shape in their side profile. Although angles $\alpha 1$ and $\alpha 2$ are about 18° conforming relief angle and angles $\alpha 3$ and $\alpha 4$ are about 8° conforming rake angle in a hand pulling saw of the Japanese style, both pairs of angles are reversed in a hand pushing saw of the western style. Thus, the relative positions of these angles may be varied suitably or the angles may be made approximately similar in size and the teeth may be formed in triangular shapes with sides of equal length, if the angle adopted for the blade is the same from $\alpha 1$ to $\alpha 4$. Since angles $\beta 1$ to $\beta 4$ comprise the cutting edge angles, they may be increased or decreased without difficulty, although the angles in the drawings are assumed to be approximately 45°.

Furthermore, the arrangement sequence of the grinders 2a – 2d may be changed suitably with a wide degree of freedom. Further, as the grinders used in accordance with the invention, thin disc grinders are preferable. While feeding the grinders toward the work material along the two dimensionally inclined direction as described above, it is desirable to add separate cooling means as well as a stabilizing means or antiswing device. Cooling of the grinders prevents possible tempering of the work material and the stabilizing means prevents swing or vibration of the disc grinders during blade forming.

Figure 2:
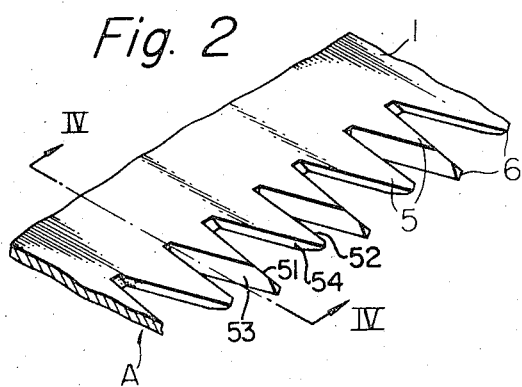
FIG. 2 is a partial perspective view of a saw according to the invention.
Figure 4:
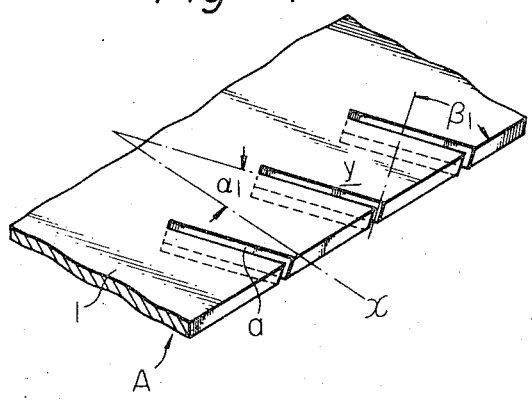
FIG. 4 to FIG. 7 show perspective views illustrating the process of saw blades manufacture according to the invention.
Figure 5:
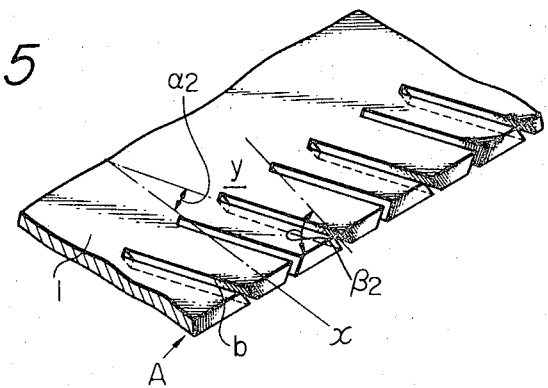
Figure 6:
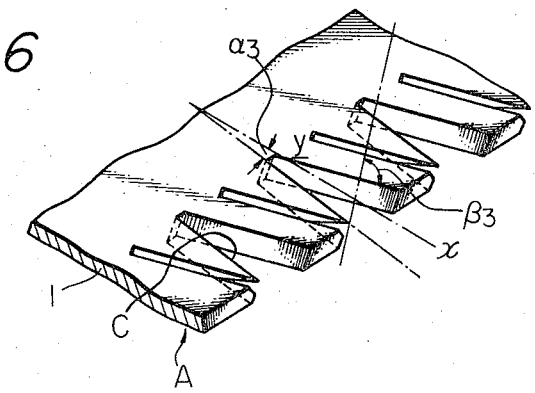
Figure 7:
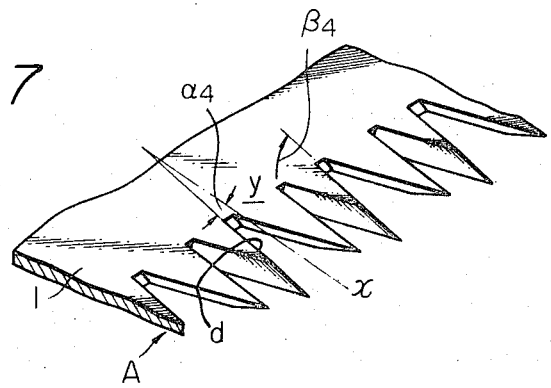

Grinders 2a – 2d are disposed as shown in FIG. 1 and work material 1 is arranged to be shifted in the direction of the arrow along guide duct 4 formed on frame 3 intermittently during the interval in which the grinders have completed their feed cycles. Thus, the grinders are moved back and forth toward edge A of material 1 while the material is securely held in a still position. After one complete feed cycle of the grinders, work material 1 is fed or shifted laterally by 1 pitch. The openings a as shown in FIG. 4 are cut at predetermined intervals by first grinder 2a and the openings b as shown in FIG. 5 are formed subsequently (in addition to openings a) by second grinder 2b fed to the middle point of the openings a. Similarly, the third and fourth grinders 2c and 2d are subsequently fed adjacent to the openings a and b previously formed to remove V shape scrap and form openings c and d as shown in FIG. 6 and FIG. 7 to complete desired teeth profile 5. Faces 51 and 52 of the blades are formed by the grinders 2b and 2d, flanks 53 and 54 are formed by the grinders 2a and 2c. The sequence of operation is clearly understood by a careful study of FIGS. 4 – 7. Ultimately, saw teeth as shown in FIG. 2 can be produced by cutting blade top 6 indicated in FIG. 2 and FIG. 3 on the top edge of tooth 5 using a fifth cutter or grinder (not shown).

According to the method of the invention, work material comprising a steel plate having an extended trapezoidal cross-section, previously quenched and plated, is held intermittently and movably in one direction while four disc grinders, inclined in two directions to a predetermined degree, are positioned against the blade or thick edge of the work material.

Since these grinders are fed to cut the work material together with separately added cooling and stabilizing or antiswing means, two operations, blade shaping and edge forming, are carried out simultaneously and yet, due to the trapezoidal cross-section of the work material, the separate forming process used to provide alternative cross deviation of adjacent teeth peculiar to saw blades is not required. Thus saws with sharp and continuous blades, excellent in cutting and antiwearing characteristics can be produced efficiently and continuously. Further, various adjustments in the inclination angle of the grinders provides for production of miscellaneous kinds of saws, such as cross, miter and other cutting saws, of course including pulling and pushing hand saws.

What is claimed is:

1. A method of manufacturing saws from band steel plates comprising
   a. providing a preliminarily quenched and plated band steel plate work material having a trapezoidal cross section extending along the length of said material to form a blade or front edge which is thicker than the opposite or rear edge thereof;
   b. securely positioning the work material so as to expose the blade edge thereof and to permit intermittent movement in one direction;
   c. simultaneously and reciprocatively making four individual predetermined two dimensionally inclined cuts to a desired depth in said material while said material is being maintained in a stationery position;
   d. laterally shifting said material to the extent of one pitch after completing cutting;
   e. alternately repeating cutting and lateral shifting of said material so as to superimpose each cut on said blade edge to complete the formation and shaping of the saw teeth.

2. Method according to claim 1 in which the two dimensional inclination of the individual cuts is defined by relief angles $\alpha 1$ and $\alpha 2$, rake angles $\alpha 3$ and $\alpha 4$ extending horizontally from a line normal to the front edge of said material and cut edge angles $\beta 1$, $\beta 2$, $\beta 3$ and $\beta 4$ extending vertically from the top surface of said material.

3. Method according to claim 2 in which $\alpha 1$ and $\alpha 2$, and $\alpha 3$ and $\alpha 4$ form pairs of equal angles, said pairs of angles being unequal to each other.

4. A method of manufacturing saws from band steel plates comprising
   a. providing a preliminarily quenched and plated band steel plate work material having a trapezoidal cross section extending along the length of said material to form a blade or front edge which is thicker than the opposite or rear edge thereof;
   b. securely positioning the work material so as to expose the blade edge thereof and to permit intermittent movement in one direction;
   c. arranging four thin disc grinders in a predetermined grinder sequence, each grinder being selectively positioned in two dimensional inclination in confronting relationship with the blade edge of said material;
   d. reciprocatively feeding the grinder sequence against said material to a desired depth to provide cuts conforming to each individual grinder in said material while said material is being maintained in a stationery position;
   e. laterally shifting said material to the extent of one pitch after completing the cutting cycle of the grinder sequence; and
   f. alternately repeating the cutting cycle and the lateral shifting of said material so as to superimpose the cutting action of each grinder on said blade edge to complete the formation and shaping of the saw teeth.

5. Method according to claim 4 in which the two dimensional inclination of the individual grinders is defined by angles $\alpha 1$, $\alpha 2$, $\alpha 3$ and $\alpha 4$ extending horizontally from a line normal to the front edge of said material and angles $\beta 1$, $\beta 2$, $\beta 3$ and $\beta 4$ extending vertically from the top surface of said material.

6. Method according to claim 5 in which relief angles $\alpha 1$ and $\alpha 2$, and rake angles $\alpha 3$ and $\alpha 4$ form pairs of equal angles, said pairs of angles being unequal to each other.

7. Method according to claim 4 in which cooling is provided during the cutting cycle to prevent tempering of the work material.

8. Method according to claim 4 in which the grinder sequence is stabilized against vibration while being fed against said material.

9. A method of manufacturing a saw blade wherein saw teeth are formed on a plate by making four series of parallel cuts into the plate along an edge thereof, each of said four series of cuts being made in four respectively different selected orientations relative to the plate and extending inwardly of the plate from said edge, and each adjacent cut in any one series of cuts being spaced by a distance equal to twice the pitch of said teeth, said series of cuts combining to produce said saw teeth.

* * * * *